April 26, 1966  G. E. RYCKMAN  3,247,787
MULTICOLOR STAMPING MACHINE
Filed March 3, 1964  6 Sheets-Sheet 1

INVENTOR.
George E. Ryckman
BY
W. B. Harpman
ATTORNEY.

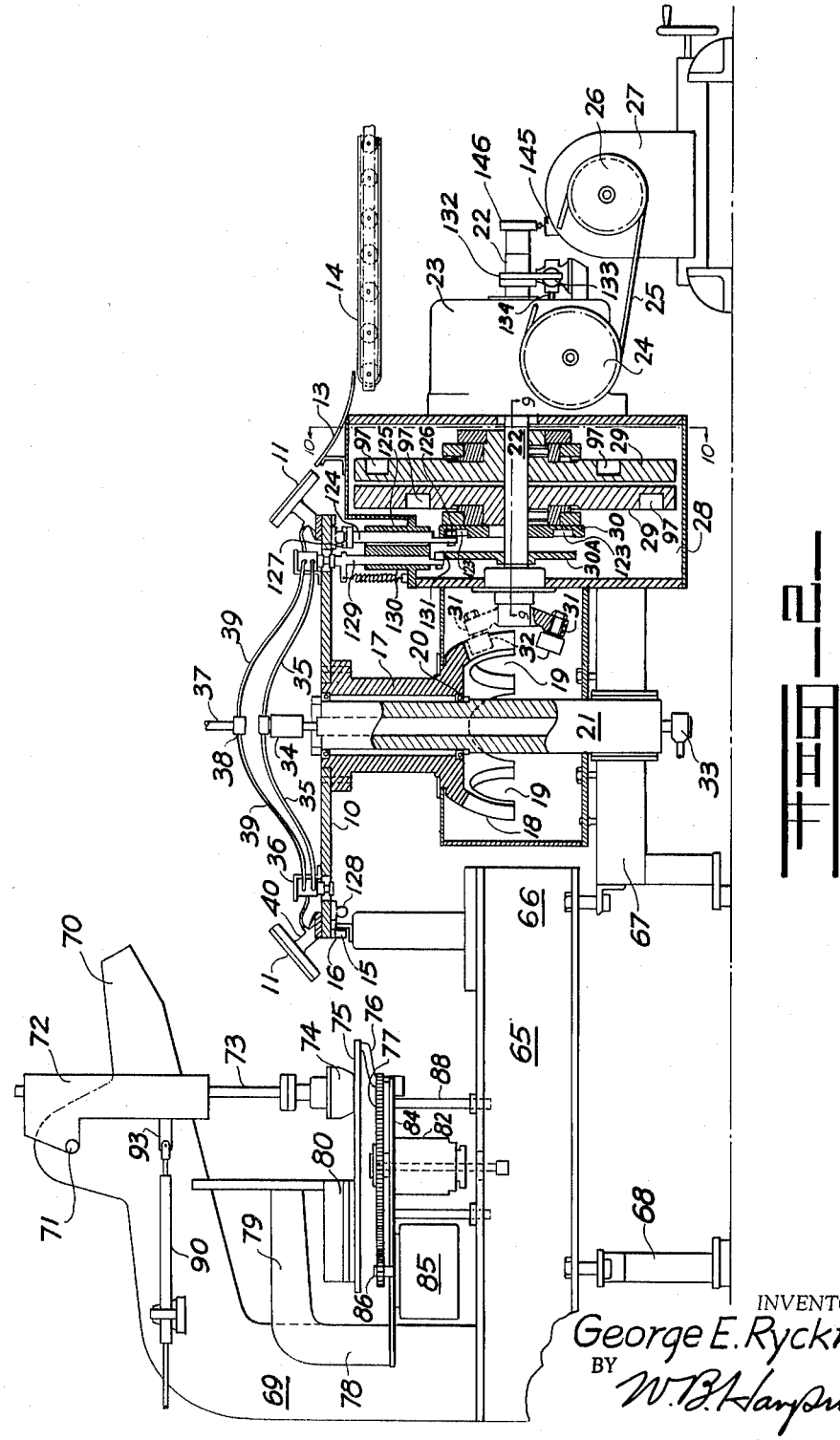

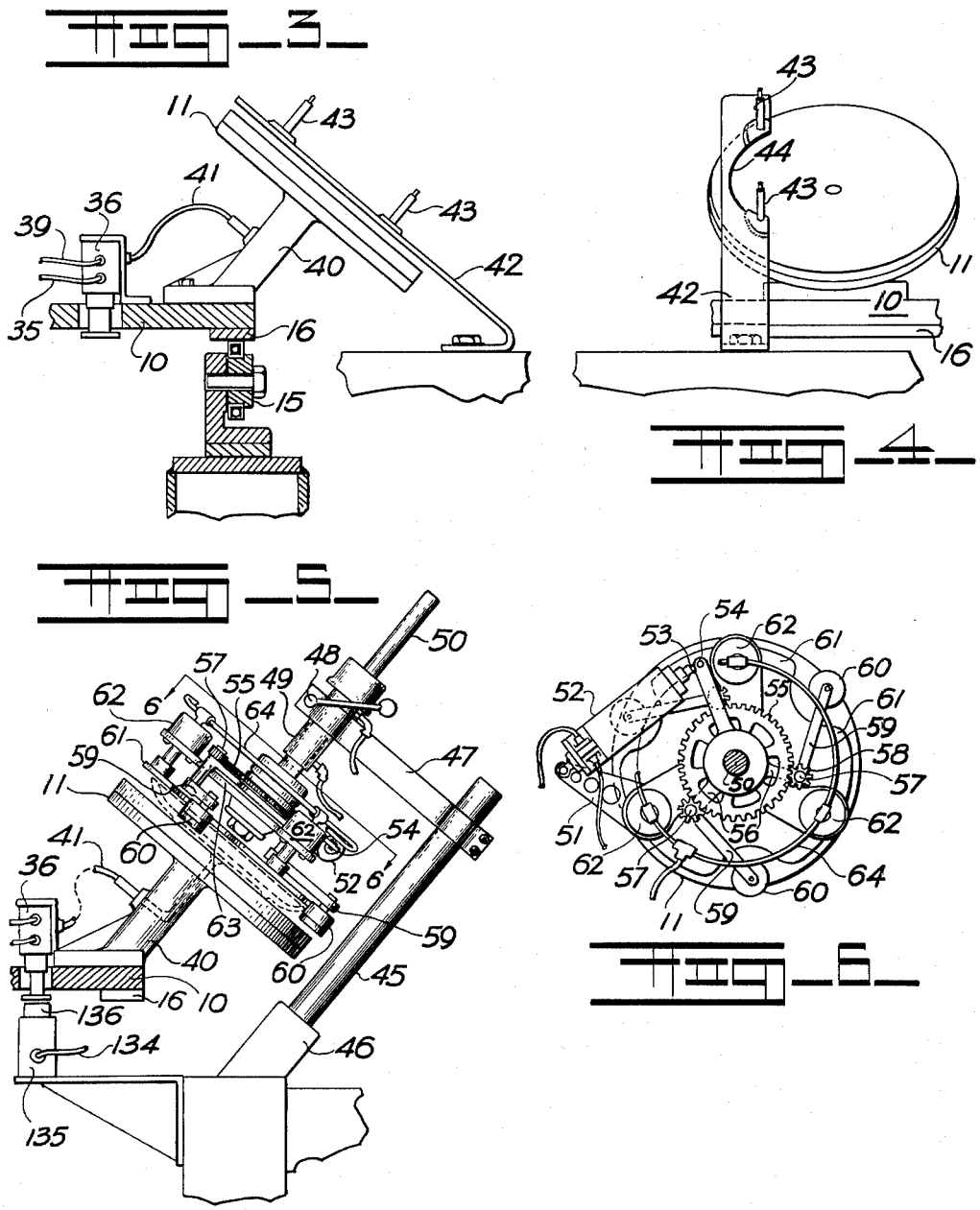

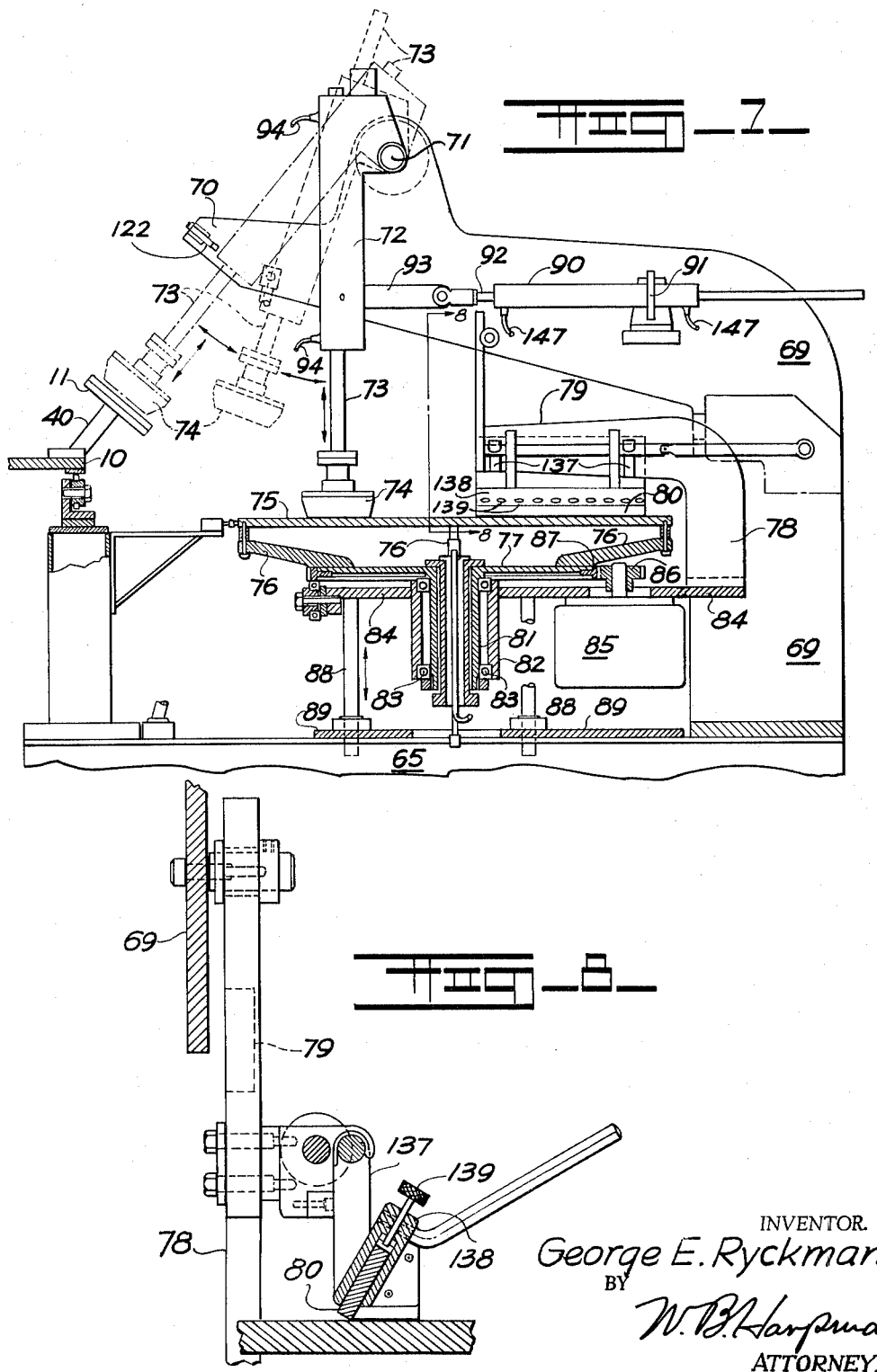

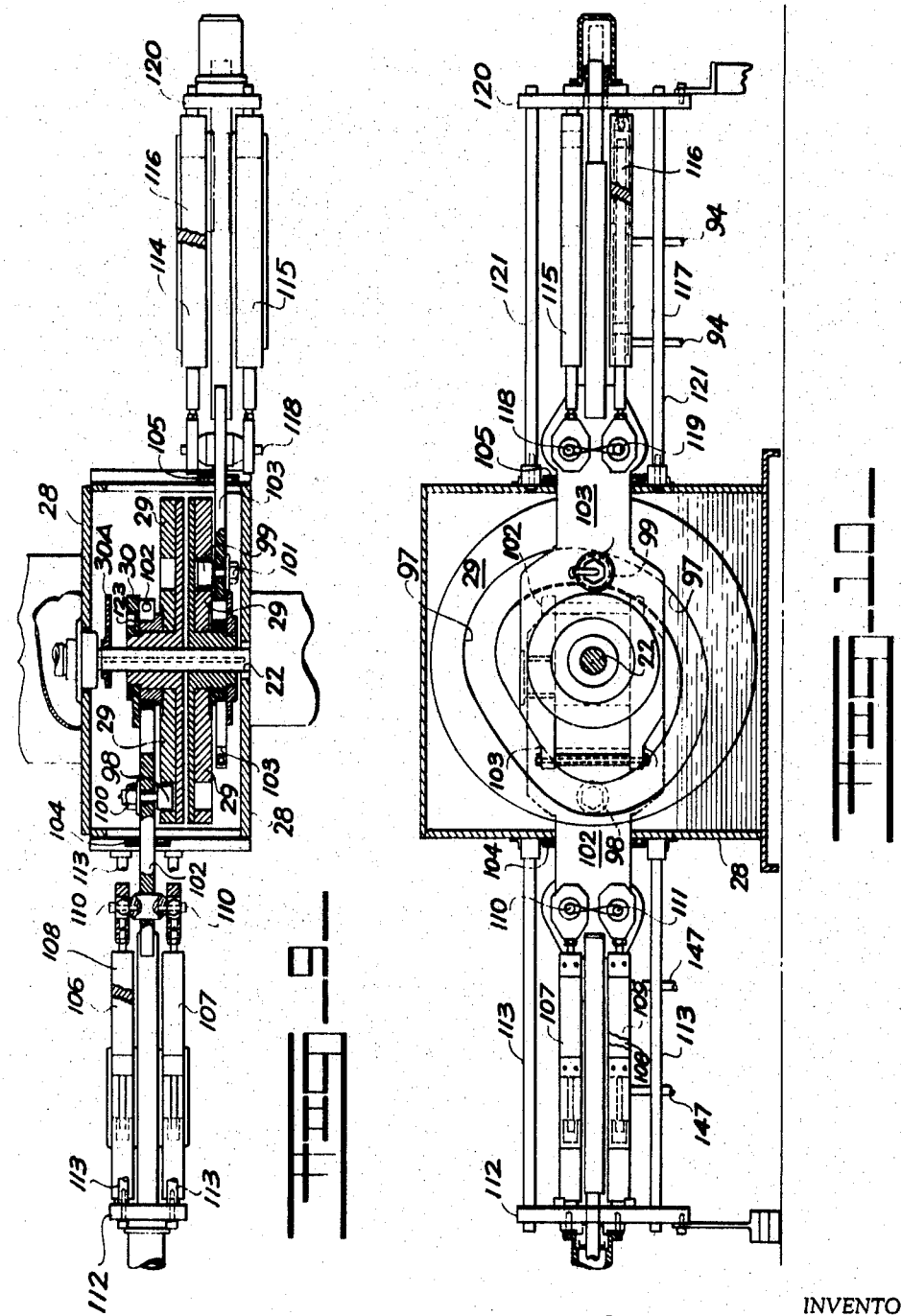

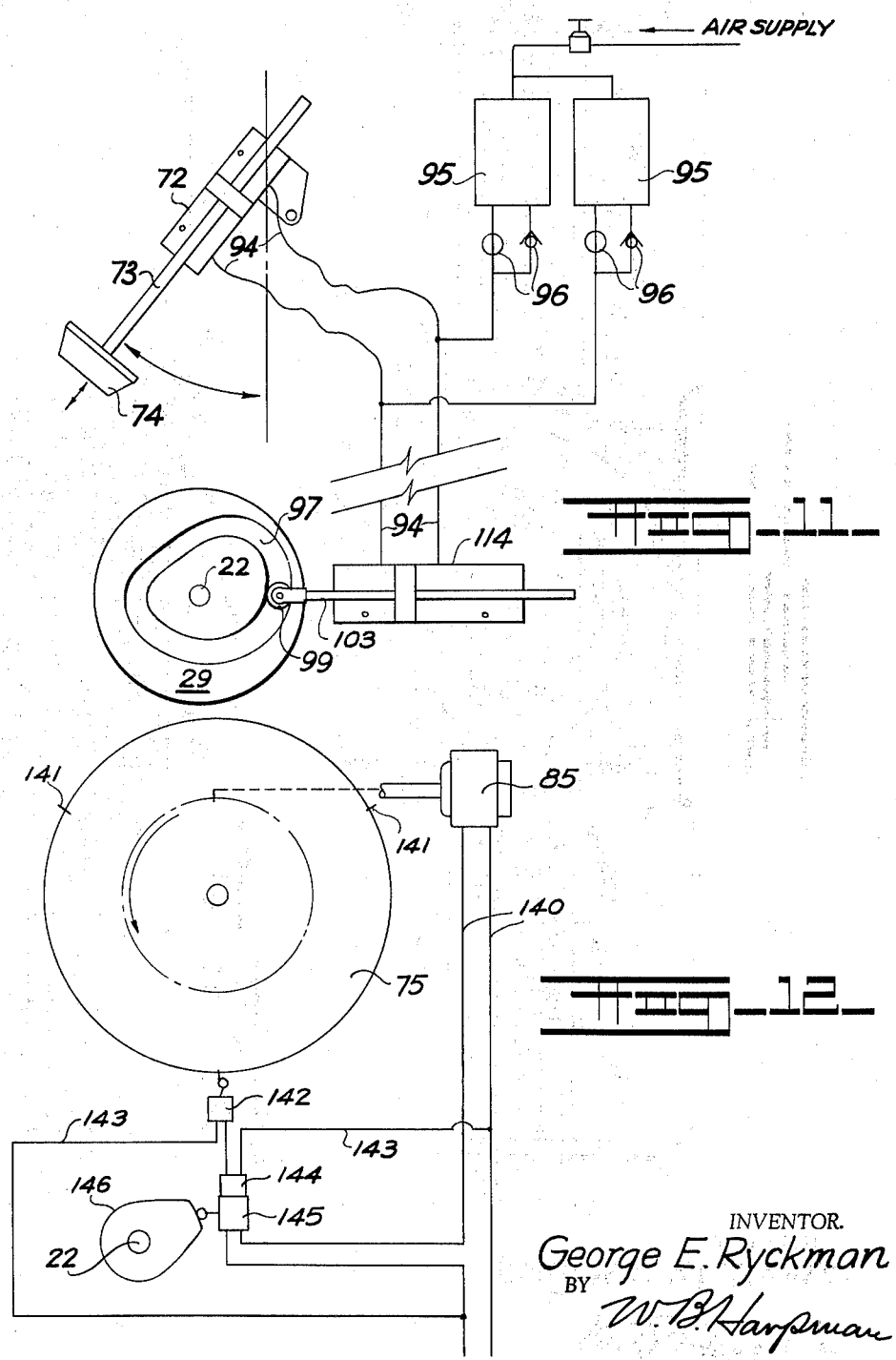

United States Patent Office 3,247,787
Patented Apr. 26, 1966

3,247,787
MULTICOLOR STAMPING MACHINE
George E. Ryckman, East Liverpool, Ohio, assignor to
The Taylor Smith & Taylor Company, Chester, W. Va.,
a corporation of West Virginia
Filed Mar. 3, 1964, Ser. No. 348,979
11 Claims. (Cl. 101—44)

This invention relates to the stamping of ceramic ware and particularly to the stamping of plates with desired decorations.

The principal object of the invention is the provision of a machine which will apply decorative designs in multiple colors to plates, dishes and the like in such manner that the decorations will be perfectly registered, smooth and uniform.

A further object of the invention is the provision of a multicolor stamping machine that will operate rapidly with a minimum of lost motion to successively stamp decorative designs on ceramic ware.

A still further object of the invention is the provision of a multicolor stamping machine that will automatically center the ceramic ware with respect to individual ware holders, which, in turn, travel in a circular path in the machine.

A still further object of the invention is the provision of a multicolor stamping machine for ceramic ware incorporating novel indexing means for positioning ware holders relative to loading, centering, and stamping stations in the machine.

A still further object of the invention is the provision of a multicolor stamping machine for ceramic ware incorporating novel color-applying stamps arranged for picking up colors and applying them to the ware with a minimum of travel in a short time cycle.

A still further object of the invention is the provision of a multicolor stamping machine for ceramic ware incorporating a series of interdependent ware holding, centering, and stamping devices arranged in a compact assembly.

The multicolor stamping machine disclosed herein comprises an improvement in the art of decorating ceramic ware. Proposals have heretofore been made to stamp decorations on ceramic ware and the several machines constructed in accordance with such proposals have not been successful commercially primarily because of the difficulty of properly presenting a color carrying stamp to the ware and keeping the ware in position for perfect registry with successive color applying stamps. Additionally, a major problem in the prior art involved the mechanical devices necessary to move the stamp from inking position to stamping position in a precise, exactly controlled motion and in a time cycle short enough to permit an economic production rate. These several proposals as well as others have been met by the invention disclosed herein.

With the foregoing and other objects in view which will appear as the description proceeds, the invention resides in the combination and arrangement of parts and in the details of construction hereinafter described and claimed, it being the intention to cover all changes and modifications of the example of the invention herein chosen for purposes of the disclosure, which do not constitute departures from the spirit and scope of the invention.

The invention is illustrated in the accompanying drawings, wherein:

FIGURE 2 is a front elevational view with parts broken away and parts in cross section.

FIGURE 3 is an enlarged cross section detail of a portion of the multicolor stamping machine shown in FIGURES 1 and 2.

FIGURE 4 is a front elevational view of the portion of the stamping machine shown in FIGURE 3.

FIGURE 5 is a side elevational view of a ware centering portion of the stamping machine.

FIGURE 6 is a cros section on lines 6—6 of FIGURE 5.

FIGURE 7 is a side elevational view with parts broken away and parts in cross section illustrating one of the stamping portions of the machine.

FIGURE 8 is an enlarged vertical section on line 8—8 of FIGURE 7.

FIGURE 9 is a horizontal section on lines 9—9 of FIGURE 2.

FIGURE 10 is a vertical section on lines 10—10 of FIGURE 2.

FIGURE 11 is a symbolic diagram illustrating the operation of the stamping portion of the machine.

FIGURE 12 is a symbolic diagram illustrating a control circuit for the color disc portion of the stamping machine shown in FIGURES 2 and 7.

Figure 1:
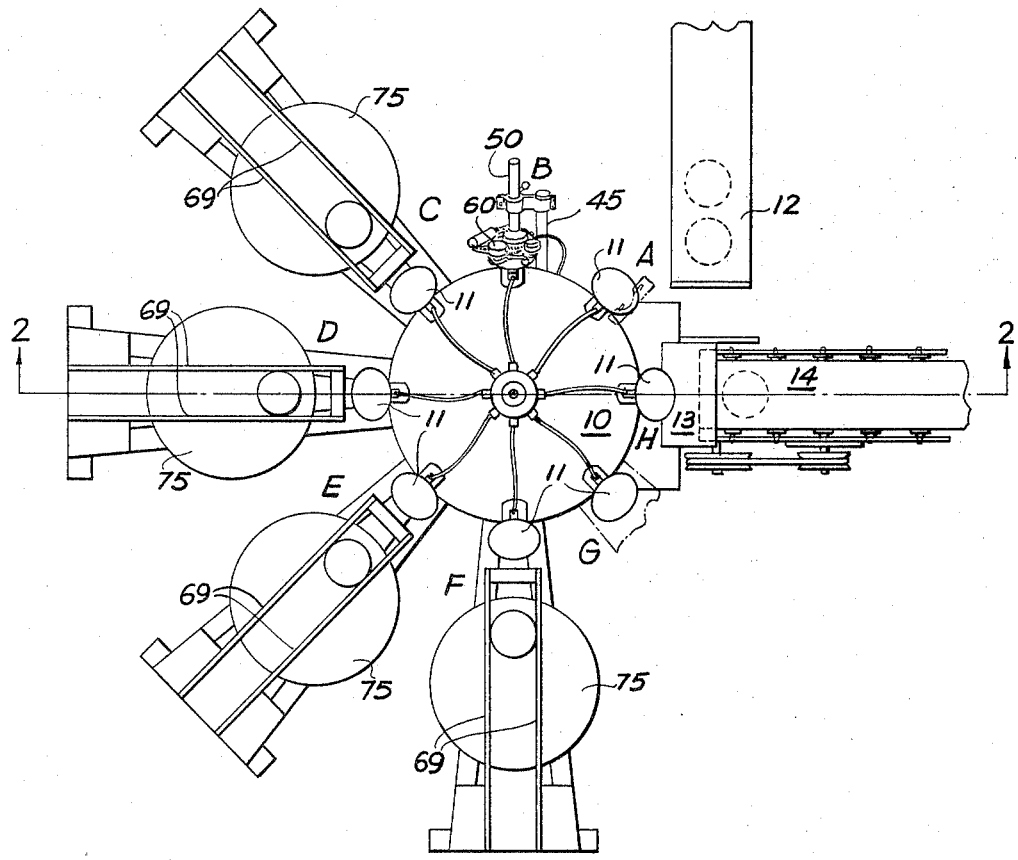
FIGURE 1 is a top plan view of the multicolor stamping machine.

By referring to the drawings and FIGURE 1 in particular, it will be seen that there is a rotatable turntable 10 positioned centrally thereof and supporting a plurality of circumferentially spaced ware holders 11. One of the ware holders indicated by the numeral 11 is shown in loading position at loading station A which includes a platform 12 on which ware to be decorated is positioned. Positioned counterclockwise relative to the loading station A there are a centering station B and a plurality of circumferentially spaced color stamping devices at stations C, D, E and F, a blank station G and an unloading station H. The unloading station H is adjacent a slide 13, the lower end of which overlies a conveyer 14 which removes the decorated ware.

By referring to FIGURE 2 of the drawings, it will be seen that the rotatable turntable 10 is supported beneath its peripheral edge by rollers 15 engaging an annular track 16 thereon and rotated in a step-by-step positive indexing motion by a modified Geneva movement mechanism located centrally therebeneath. The Geneva mechanism includes a centrally disposed vertically positioned cylindrical member 17 secured at its uppermost end to the turntable 10 and having an annular outwardly flared depending flange 18 on its lower end. The annular flange 18 is provided with a plurality of circumferentially spaced arcuate cut-away areas 19. Anti-friction bearings 20 position the member 17 relative to a fixed vertical post 21. A drive shaft 22 is positioned horizontally through a gear box 23 which has an input sheave 24 connected by a flexible belt 25 with a driven sheave 26 on a motor 27. The drive shaft 22 extends through a housing 28 in which a plurality of cams 29 and 30 are positioned together with cam actuated means supplying timed motion to the respective portions of the multicolor stamping machine as hereinafter described.

An angularly extending arm 31 is attached to the end of the drive shaft 22 and carries a roller 32 which is arranged to engage the arcuate cutaway areas 19 in the annular flange 18 of the cylindrical member 17 upon each revolution of the shaft 22 so as to revolve the cylindrical member 17 in an indexing motion when the drive shaft 22 revolves.

A source of vacuum such as a vacuum pump (not shown) is in communication with a fitting 33 on the lower end of the post 21 which is hollow so that a multi-connection fitting 34 at its uppermost end may be connected with a plurality of vacuum lines 35 which extend to two-way valves 36 adjacent each of the ware holders 11. A compressed air line 37 extends from an air compressor (not shown) to a secondary multiple connection fitting 38 located above the multi-connection fitting 34 and air lines 39 extend to each of the two-way air valves 36 heretofore referred to. The two-way valves 36 are actuated by valve operating plungers positioned beneath the turntable 10 and deriving motion from one of the cams 30 on the shaft 22 as best seen in FIGURE 3 of the drawings.

As best seen in FIGURE 3 of the drawings, the ware holders 11 comprise discs supported on angular brackets 40 circumferentially spaced on the turntable 10, each of the ware holders 11 having a cushioned inclined ware receiving surface. The ware holders are apertured and a communicating passageway extends through each of the angular brackets 40 to a flexible hose 41 which extends to the adjacent two-way air valve 36 heretofore described. The two-way air valve 36 controls the compressed air or vacuum directed to the ware holder 11 so that each of the ware holders 11 upon reaching loading station A, as seen in FIGURE 1 of the drawings, is connected by action of the two-way valve 36 adjacent thereto with the vacuum line 35 so that the ware will be held on the inclined surface of the ware holder 11.

By referring again to FIGURES 3 and 4 of the drawings, it will be seen that there is an angularly disposed guide arm 42 attached to the base of the machine and extending upwardly and over the ware holder 11 at the loading station A. A pair of perpendicular guide rods 43 are positioned on the edge of the guide arm 42 and at either end of an arcuate guide surface 44 formed in one side of the guide arm 42. The guide arm 42 is adjustably mounted and enables an operator to position a piece of ware thereagainst and lower the same onto the ware holder 11 where it is to be held by the vacuum action heretofore described.

The next indexing motion of the turntable 10 moves the ware holder 11 with the ware thereon from loading station A to centering station B as seen in FIGURE 1 of the drawings.

By referring now to FIGURES 5 and 6 of the drawings, detailed views of a centering mechanism located at centering station B may be seen. An angularly disposed post 45 is mounted by means of a bracket 46 on a base portion of the machine at a point beyond the peripheral edge of the turntable 10. An arm 47 extends upwardly and outwardly from the upper end of the post 45 and on a parallel plane with the surface of the ware holder 11. A clamp 48 on the end of the arm 47 holds a cylinder 49 which in turn slidably mounts an elongated piston rod 50 which extends completely through the cylinder 49 and has a piston thereon (not shown) positioned in the cylinder 49 which is arranged for double action and actuated by fluid pressure supplied through a pair of flexible hoses. The lower end of the piston rod 50 has an arm 51 extending outwardly therefrom which pivotally supports one end of an air cylinder 52, the piston rod 53 of which extends from the other end and engages the outer end of an arm 54 which extends outwardly from a sleeve positioned on the piston rod 50 and attached to a sun gear 55, which is rotatably mounted on the piston rod 50 and movable relative thereto by action of the air cylinder 52. Three secondary arms 56 also attached to the piston rod 50 have journals at their outermost ends which rotatably mount stub shafts 57 on which pinions 58 are so positioned as to be engaged with the periphery of the sun gear 55. Secondary arms 59 are secured to the lower ends of each of the stub shafts 57 and in turn journal resilient rollers 60. It will be observed that the axes of the rollers 60 are parallel with the axis of the piston rod 50 and with the axis of the angular bracket 40 which supports the ware holder 11 immediately thereberneath.

A scalloped disc 61 the same size as the ware holder 11 is positioned thereabove by three circumferentially spaced air cylinders 62 which in turn are carried on a spider 63 secured to the bottom end of the piston rod 50.

The air cylinders 62 include piston and piston rods normally urged upwardly by spring means and air tubing connections communicating with an air tubing 64 which leads to a valve controlled source of compressed air. The disc 61 forms a surface against which a piece of ware may be held by compressed air directed against the bottom thereof as controlled by the two-way valve 36 heretofore referred to.

In FIGURES 5 and 6 of the drawings broken line illustrations of a piece of ceramic ware may be seen, and it will be observed that the resilient rollers 60 are positioned to engage the peripheral edge thereof. In operation, the ware holder 11 holding the ceramic ware by vacuum moves into the centering station B and stops with the ware holder 11 in proper alignment with the ware centering mechanism whereupon air pressure is introduced into the cylinder 49 to move the piston rod 50 and the various parts carried thereby downwardly on an angle toward the ware holder 11. The two-way air valve 36 then operates to release the vacuum holding the ware and directs compressed air thereagainst which floats the ware away from the ware holder 11 and against the disc 61. Simultaneously, the air cylinder 52 moves the arm 54 and hence the sun gear 55 which motion causes the rotation of the stub shafts 57 and a swinging motion of the arms 59 carrying the rollers 60 so as to bring the rollers 60 into circumferentially spaced moving engagement with the peripheral edge of the ware and center the same.

When this occurs, air pressure is introduced into the air line 64 and the air cylinders 62 move the disc 61 downwardly in an air cushioned action and press the piece of ware against the cushioned surface of the ware holder 11. The air valve 36 reverses, redirecting the vacuum to the ware which is then held in perfectly centered relation on the ware holder 11 and air pressure is then introduced into the opposite side of the cylinder 49 to cause the centering device to retract in which action it moves upwardly and outwardly away from the ware. The turntable 10 then rotates this ware holder with the centered ware to first stamping station C. Air valves actuated by cams on drive shaft 22 supply the necessary timing.

Referring again to FIGURE 1 of the drawings, it will be observed that four stamping stations C, D, E, F are shown so that the stamping machine illustrated and described can apply four separate and distinct colors to the ceramic ware. A fifth station H may be used to apply a fifth color if desired or it may be used for some other purpose as will occur to those skilled in the art. The four stamping stations C, D, E and F have identical stamping devices, and by referring now to FIGURES 2 and 7 of the drawings, one of these devices may be seen.

In FIGURE 2 of the drawings, a side elevation illustrates a wedge shaped frame 65, the forward or narrow end 66 thereof being supported on a portion of a base 67 which also supports the turntable 10, while the outermost or wide end is supported on a leg 68. A pair of horizontally spaced vertically standing body members 69 are secured to one another and include forward extensions 70, the outermost ends of which overlie the ware holders 11 on the peripheral edge of the turntable 10. A transverse pivot 71 movably mounts a hydraulic piston and cylinder assembly 72, the piston rod 73 of which carries a detachable stamping head 74 on its lowermost end. The stamping head 74 is arranged to move downwardly into engagement with the upper surface of a color disc 75. The color disc 75 is supported at its peripheral edge on a plurality of circumferentially spaced radially extending arms 76 which are carried on a driving disc 77. A secondary body member 78 has a forwardly projecting extension 79 which operatively positions a doctor blade 80 on the color disc 75. The driving disc 77 has a centrally located depending cylindrical member 81 which is journalled in a cylindrical body 82 by antifriction bearings 83. The cylindrical body 82 is mounted on a transversely extending frame member 84 which supports the secondary body member 78 therefore referred to. A gear box 85 is also attached to the transversely extending frame member 84 and a pinion 86 on the upper surface of the gear box engages the gear teeth 87 in the peripheral edge of the driving disc 77. The transverse frame member 84 is positioned on three vertically adjustable legs 88 which rest on a base plate 89 on the wedge-shaped frame 65. The adjustable legs 88 may comprise screw jack assemblies by means of which the entire color disc 75 and its supporting and driving means may be moved vertically so as to be desirably positioned with respect to the stamping head 74. Rollers on the transverse frame member 84 support the peripheral edge of the driving disc 77.

Still referring to FIGURE 7 of the drawings, it will be seen that the transverse pivot 71 positions the hydraulic piston and cylinder assembly 72 above and to one side of the peripheral edge of the turntable 10 and more specifically the ware holders 11 thereon. It will further be seen that a secondary hydraulic piston and cylinder assembly 90 is mounted on a secondary transverse pivot 91 which extends between the body member 69 and is arranged so that the forward end of the piston rod 92 thereof is pivotally connected by means of a link 93 with the lower end of the hydraulic piston and cylinder 72. It will thus be seen that this arrangement provides for two motions on the part of the stamping head 74, which motions are indicated by arrows in FIGURE 7. The stamping head 74 is shown in solid lines in lower position relative to the hydraulic piston and cylinder assembly 72 and with the same in vertical position so that the stamping head 74 is properly engaged against the color disc 75 so as to pick up color therefrom. Hydraulic lines 94 extend from the hydraulic piston and cylinder assembly 72 to a source of fluid pressure as may be seen symbolically in FIGURE 11 of the drawings wherein a master piston and cylinder assembly is arranged with its piston rod engaged in a track in a cam 29 as heretofore referred to.

By referring now to FIGURE 2 of the drawings, an enlarged cross sectional elevation through the cams 29 may be seen, and it will be observed that these cams 29 are the cams mounted on the shaft 22 and enclosed in the housing 28 as seen in FIGURE 2 of the drawings.

By referring now to FIGURES 9 and 10 of the drawings, it will be observed that each of the cams 29 comprise discs secured to the shaft 22 and that each of them has a cam track in its opposite face in which rollers 98 and 99 respectively comprising cam track followers are engaged. The rollers 98 and 99 are secured to arms 100 and 101 respectively attached to yokes 102 and 103 respectively which are arranged in oppositely disposed relation and extend outwardly through openings 104 and 105 respectively in the housing 28 and at right angles to the axis of the drive shaft 22. The yokes 102 and 103 are bifurcated and the bifurcated sections are spaced with respect to one another and positioned one on either side of the drive shaft 22 so that the motion imparted the yokes 102 and 103 by the rollers 98 and 99 is reciprocal and on their longitudinal axes.

The yoke 102 is arranged to drive four individual piston and cylinder assemblies 106, 107, 108 and 109 as seen in FIGURES 9 and 10 of the drawings wherein the piston rods of the individual piston and cylinder assemblies are pivotally connected to the outer ends of two pins 110 and 111. Each of the four piston and cylinder assemblies 106, 107, 108 and 109 are connected by hydraulic lines 147 with the piston and cylinder assemblies 90 heretofore referred to as being located one in each of the stamping portions of the multicolor printing machine (see FIGURE 7 of the drawings).

It will be seen that the four individual cylinders 106, 107, 108 and 109 are secured to a vertical body member 112, which, in turn, is attached by tie rods 113 with the housing 28 heretofore referred to. It will be understood by those skilled in the art that the four piston and cylinder assemblies 106, 107, 108 and 109 are simultaneously driven by the yoke 102 and its cam track follower 98 and that each of the four piston and cylinder assemblies 106, 107, 108 and 109 are connected with the individual piston and cylinder assemblies 90 located one in each of the stamping portions C, D, E and F of the multicolor printing machine.

It will thus be seen that each rotation of the main drive shaft 22 and the cams 29 causes the four piston and cylinder assemblies 106, 107, 108 and 109 to originate fluid pressure for actuating the secondary hydraulic piston and cylinder assemblies 90 which are in effect slave cylinders and each of which acts to impart traverse motion to the stamping device comprising the hydraulic piston and cylinder assemblies 72 and the stamping heads 74 actuated thereby.

Still referring to FIGURES 9 and 10 of the drawings, it will be observed that the oppositely arranged yoke 103 is arranged to drive four individual piston and cylinder assemblies 114, 115, 116 and 117, the piston rods of which are pivotally connected to the outer ends of a pair of transversely positioned pins 118 and 119 and the cylinders of which are engaged against a body member 120 which, in turn, is attached to the housing 28 by tie rods 121. Hydraulic lines 94 connect each of the four individual piston and cylinder assemblies 114, 115, 116 and 117 with the four hydraulic piston and cylinder assemblies 72 which are located one in each of the stamping portions of the machine as seen in FIGURE 7.

It will thus be seen that each rotation of the drive shaft 22 imparts horizontal motion to the yoke 103 and to the individual piston rods of the piston and cylinder assemblies 114, 115, 116 and 117 to provide individual sources of fluid pressure which are in communication with the individual hydraulic piston and cylinder assemblies 72 and are therefore, in effect, slave cylinders. The hydraulic piston and cylinder assemblies 72 impart vertical motion to the stamping heads 74 as heretofore described.

It will thus be seen that precise and accurate timing of the power impulses used to actuate the stamping portions of the multicolor printing machine are provided and that, as best seen in FIGURE 7 of the drawings, the sequence of operations comprises the lowering of the stamping head 74 to engage the color disc 75, retracting the same whereupon the secondary cylinder 90 is energized to swing the stamping head 74 and its motion imparting cylinder 72 outwardly on the pivot 71 to an angular position where the cylinder 72 meets an adjustable stop 122 and is thereby aligned perfectly with the axes of the angular bracket 40 of the ware holder 11 in desired indexed position for engagement with the stamping head 74 which is then moved downwardly by the cylinder 72 to engage the ware and immediately retracted, whereupon the secondary cylinder 90 operates to move the stamping head and cylinder 72 inwardly to vertical position to complete the cycle.

It will be understood that each of the stamping portions of the multicolor stamping machine as indicated at the stamping locations C, D, E, and F in FIGURE 1 of the drawings is identical with the construction illustrated in FIGURES 2 and 7 just described.

In order that the turntable 10 may be exactly located with respect to its indexed positions, as heretofore described, mechanism is provided in conjunction with the drive mechanism and more particularly the drive shaft 22 for positively locking the turntable 10 in indexed position as may best be seen by referring to FIGURES 2 and 9 of the drawings.

By referring to FIGURE 2 of the drawings, it will be seen that two cams 30 and 30A are secured to the drive shaft 22 and positioned adjacent the cams 29 heretofore referred to. One of the cams 30 has a track 123 therein and the other cam 30A comprises a cam disc. A spring urged rod 124 mounted in a tubular guide 125 is arranged with its cupped upper end 127 positioned in spaced relation to the underside of the turntable 10 and a plurality of circumferentially spaced spheres 128 thereon. The cupped head 127 on the end of the rod 124 is urged into engagement with the spheres 128 by spring tension when permitted by the cam 123 and thereby insures positive indexing of the turntable 10, and more particularly the ware holders 11 with the several stations of the multicolor printing machine as hereinbefore described.

Positioned alongside the rod 124 there is a secondary actuating rod 129 positioned in a tubular guide 130 and having a roller 131 on its lower end engaging the periphery of the cam disc 30A. The upper end of the secondary actuating rod 129 is positioned beneath the bottom of the turntable 10 and arranged to move upwardly into openings therein so as to engage a movable valve element in one of the two-way air valves 36 so as to actuate the same and release the ware from the ware holders 11 at unloading station H, as shown in FIGURE 2 of the drawings.

It will occur to those skilled in the art that the ware being stamped by the multicolor stamping machine sometimes is of uneven thickness and/or shape and that the engagement of the stamping heads 74 of the machine must therefore be operated so as to compensate for such irregularity. In the present disclosure, this is accomplished by providing a device that reciprocates each printing head along the axis of its moving cylinder 72 under close timing control so that it advances and retracts in prescribed timing and under prescribed acceleration and at the same time provides automatic compensation for fluid leakage losses.

By referring now to FIGURE 11 of the drawings, a symbolic illustration of the hydraulic operation of one of the printing heads 74 may be seen and it will be observed that one of the four individual piston and cylinder assemblies 114, 115, 116 and 117 is illustrated, together with its driving yoke 103 and its cam follower roller 99 engaged in a track 97 in the cam 29 on the shaft 22. The hydraulic lines 94 connecting the cylinder 114 with the slave cylinder 72 are individually connected with oil reservoirs 95 by way of relief and check valves 96 so that as the cam 29 rotates uniformly the cam track 97 therein imparts timing and acceleration motion to the yoke 103 and piston in cylinder 114 which displaces fluid therein and through the connecting lines 94 actuates the piston in cylinder 72 to impart printing motion to the stamping head 74. The cylinder 114 is 10% larger than cylinder 72 and the excess fluid moves through relief valve 96 into reservoir 95. The relief valve 96 is set to maximum pressure to be exerted on the object being stamped and therefore performs two functions; first, the relief of excess fluid as just described, and second, the control of the pressure of stamping or printing the ware. Similar action takes place with respect to the cylinder 90 to insure proper contact with the color disc 75.

It will be obvious to those skilled in the art that since the excess fluid is moved into the reservoir 95 upon each cycle, it will be necessary to make up the fluid on the return stroke and this is accomplished by the other portion of the check and relief valve 96 as the fluid supply in the reservoirs 95 is under suitable air pressure as shown.

It will occur to those skilled in the art that in order to effectively center the ware at the centering station B as seen in FIGURE 1 and described in detail in connection with FIGURES 5 and 6 of the drawings, it will be necessary to provide means for controlling the two-way valve 36 adjacent the particular ware holder 11 in position beneath the centering device and by referring to FIGURES 2 and 5, means for accomplishing this may be seen.

In FIGURE 2, a cam 132 on the drive shaft 22 is positioned adjacent an air valve 133 which controls an air line 134 which leads from a source of compressed air to a pneumatic cylinder 135 which is positioned vertically beneath the turntable 10 and adjacent the centering station B as best seen in FIGURE 5 of the drawings. By referring thereto, it will be seen that the piston rod 136 of the pneumatic cylinder 135 is arranged to register with an opening in the turntable 10 and with the valve element in the two-way air valve 36 located on the turntable 10 immediately thereabove. As heretofore described, the two-way air valves 36 control the vacuum and air pressure lines 38 and 39 with respect to communication with the individual ware holders 11 by way of the connecting hoses 41. Thus in FIGURE 5 of the drawings, actuation of the pneumatic cylinder 135 will cause motion of the valve element in the two-way air valve 36 which will reverse the same so that instead of the vacuum line being in communication with the ware holder 11, the air pressure line will be connected and the ware will thus be floated on the compressed air upwardly against the disc 61 as heretofore described.

When the centering operation is completed, the cam 132 reverses the action of the air valve 133 which in turn reverses the action of the pneumatic cylinder 135 whereupon the piston rod 136 thereof retracts. The two-way air valve 36 reverses and the centered ware is held by the vacuum as heretofore described. The air valve 36 is not again actuated until the ware leaves the unloading station H as heretofore described.

It will occur to those skilled in the art that it will be desirable to revolve the color disc 75 and means have been provided to effect a revolving motion thereto as heretofore described in connection with FIGURE 7 of the drawings. In order to properly spread the color on the color disc 75, the doctor blade 80 is positioned radially thereof by means of vertical brackets 137 as best seen in FIGURE 8 of the drawings and which brackets 137 depend from the projecting portion 79 of the secondary body member 78 and carry a doctor blade holder 138 in which the actual doctor blade 80 is adjustably mounted by means of a plurality of adjustment screws 139.

Still referring to FIGURE 8, it will be observed that the doctor blade 80 is angularly disposed with respect to the color disc 75 and that the color will be properly and evenly spread thereby as the color disc 75 is revolved. In order that the color disc 75 can be revolved at times when the stamping head 74 is not in engagement therewith, a timing arrangement is provided and is best illustrated symbolically in FIGURE 12 of the drawings.

By referring thereto, it will be seen that the motor 85 which has been heretofore described as the means for imparting rotary action to the color disc 75 is shown in connection with an electrical energizing circuit 140. The peripheral edge of the color disc 75 is provided with circumferentially spaced projecting switch actuating members 141 arranged to engage and momentarily close an electrical switch 142 which is positioned in the multicolor printing machine for such engagement. The switch 142 is in an energizing circuit including conductors 143 and arranged to control an electric latch 144 which is part of a pull-up relay switch 145. The pull-up relay switch 145 is located adjacent the main drive shaft 22 as seen in FIGURE 2 of the drawings and more specifically adjacent an actuating cam 146 thereon which is arranged to close the pull-up relay switch 145 in a properly timed operation so as to close the energizing circuit 140 and operate the motor 85 to revolve the color disc 75. The latch 144 holds the pull-up relay 145 in closed position until such time as one of the actuating members 141 on the color disc 75 engages the switch 142 and breaks the circuit 143 to release the electric latch 144 and permit the pull-up relay switch 145 to open whereupon the motor 85 stops the rotation of the color disc 75 and the stamping head 74 moves into engagement therewith.

It will thus be seen that this arrangement is such that it is impossible for the color disc 75 to rotate when the stamping head 74 is to be engaged thereon and this eliminates any possibility of smearing the color on the stamping head 74 as might otherwise occur. The multicolor stamping machine disclosed herein is capable of rapidly and economically stamping ceramic ware and the like with desired multicolored patterns and/or designs.

It will thus been seen that a multicolor stamping machine has been disclosed which possesses the unique ability of holding, centering and stamping ceramic ware in a precisely controlled plurality of interdependent successive actions and in accordance with the several objects of the invention, and having thus described my invention, what I claim is:

1. In a machine for the multicolor decorating of dinnerware having a plurality of individual ware carriers and a rotatable support for supporting said ware carriers and moving the same in a circular path from one decorating station to another, color carrying discs in each of said decorating stations and centering means for centering said articles of ware on said ware carriers and holding means for holding said articles of ware in fixed position on said ware carriers throughout the decorating operation; a decorating stamp for decorating the ware at each of said decorating stations, an elevated support fixedly mounted at each of said decorating stations, a first reciprocal motion device pivoted to said support in depending relation thereto and above said color disc and swingable in a vertical plane, said decorating stamp carried on the free end of said first reciprocal motion device, a second reciprocal motion device on said elevated support engaging said first reciprocal motion device, said first reciprocal motion device arranged to move said decorating stamp toward and away from said ware and said color discs, and said second reciprocal motion device arranged to move said first reciprocal motion device and said decorating stamp in said vertical plane toward and away from said ware carriers and said color discs and whereby said decorating stamp moves in successive reciprocating and swinging motions based on said pivot between said first reciprocal motion device and said support.

2. In a machine for the multicolor decorating of dinnerware as set forth in claim 1 and wherein said ware carriers are circumferentially spaced around the peripheral edge of said rotatable support and inwardly of said elevated supports at said decorating stations.

3. In a machine for the multicolor decorating of dinnerware as set forth in claim 1 and wherein reciprocal indexing means is arranged to hold said rotatable support with said ware carriers in exactly aligned operative relation to said decorating stations.

4. In a machine for the multicolor decorating of dinnerware as set forth in claim 1 and wherein the centering means includes means for air lifting the articles of ware relative to said ware carriers and means simultaneously engaging the edges of the lifted article of ware at circumferentially spaced points thereon and motion imparting means moving said means engaging the lifted article of ware circumferentially and radially relative to said lifted article of ware.

5. In a machine for the multicolor decorating of dinnerware as set forth in claim 1 and wherein said first reciprocal motion device comprises a first piston and cylinder assembly having said cylinder thereof pivoted to said elevated support and wherein said second reciprocal motion device comprises a second piston and cylinder assembly having the piston rod thereof pivoted to said first cylinder assembly and the cylinder assembly thereof pivoted to said elevated support.

6. In a machine for the multicolor decorating of dinnerware as set forth in claim 1 and wherein said ware carriers include bases on said rotatable support positioned at acute angles to said rotatable support and having their ware holding surfaces at right angles with respect to said bases and wherein the longitudinal axes of said ware carrier bases are located on the same longitudinal axis of said decorating stamp and first reciprocal motion device when the same are in decorating position relative to said ware.

7. In a machine for the multicolor decorating of dinnerware as set forth in claim 1 and wherein each of said common pivotal elevated supports is positioned in each of said decorating stations at a point offset radially with respect to the peripheral edge of said rotatable support and said ware carriers thereon.

8. In a machine for the multicolor decorating of dinnerware, a plurality of angularly disposed individual ware carriers, a rotatable support for supporting said ware carriers and moving the same in a circular path from one decorating station to another, centering means for centering said articles of ware on said ware carriers and holding means for holding said centered articles of ware in fixed position on said ware carriers throughout the decorating operation, interchangeable decorating stamps for decorating the ware at each of said decorating stations, a first piston and cylinder assembly pivoted in each of said decorating stations at a point above and beyond said ware carriers on said rotatable support, said decorating stamps detachably affixed one to each of the pistons of said first piston and cylinder assembly, second piston and cylinder assemblies in each of said decorating stations, the piston rods of each of said secondary piston and cylinder assemblies pivotally engaging one of said first piston and cylinder assemblies and arranged to move said first piston and cylinder assembly on an arc based on said pivot in said decorating station into and away from perpendicular alignment with said angularly disposed individual ware carriers, means for imparting fluid pressure to said first and second piston assemblies in timed sequence, said means including a main drive, cams on said main drive and master cylinders disposed adjacent said cams and pistons in said master cylinders having means interconnecting the same and said cams and means on said main drive for imparting intermittent rotary action to said rotatable support.

9. In a machine for the multicolor decorating of dinnerware as set forth in claim 8 and wherein secondary cams are positioned on said main drive and reciprocal members are arranged to be actuated thereby, one of said reciprocal members being positioned adjacent said rotatable support for intermittent indexing engagement therewith, mechanism connected with the other of said secondary cams, said holding means on said ware carriers in communication with and controlled by said mechanism.

10. In a machine for the multicolor decorating of dinnerware as set forth in claim 8 and wherein said master cylinders and said first piston and cylinder assemblies are dual acting and fluid lines communicate therebetween and wherein said master cylinders have a relatively greater displacement than said first piston and cylinder assemblies, pressurized reservoirs in communiaction with said fluid lines and relief valves for controlling said fluid communication with said reservoirs, said relief valves arranged to alternately pass excess fluid to said reservoirs and replenish fluid in said master cylinders.

11. In a machine for the multicolor decorating of dinnerware, a rotatable support and a device for imparting intermittent rotary action to said support, a plurality of individual ware carriers supported on said rotatable support in circumferentially spaced relation, said individual ware carriers having ware receiving surfaces arranged at acute angles relative to said rotatable support, said rotatable support acting to move said individual ware carriers in a circular path, a plurality of decorating stations positioned in spaced relation to one another around said circular path, and a centering station for centering said articles of ware on said ware carriers and holding means for holding said articles of ware in centered position on said ware receiving surfaces throughout the decorating operation, said holding means operatively connected to and controlled by said device for imparting intermittent rotary motion to said rotatable support, decorating stamps for decorating the ware at each of said decorating stations and means controlled by said device imparting intermittent rotary motion to said rotatable support for moving said decorating stamps toward and away from said ware on said individual ware carriers in a reciprocating action perpendicular to said ware receiving surfaces of said individual ware carriers, said secondary means controlled by said device for imparting intermittent rotary action to said rotary support for moving said decorating stamps toward and away from said individual ware carriers in a transversely arcuate motion radially of said rotatable support, a color supplying medium in each of said decorating stations arranged for engagement by said decorating stamps when the same are moved in a reciprocal motion in a position away from said individual ware carriers.

References Cited by the Examiner
UNITED STATES PATENTS

| | | | |
|---|---|---|---|
| 2,571,638 | 10/1951 | Wells et al. | 101—335 |
| 2,603,149 | 7/1952 | Mann | 101—41 |
| 2,641,179 | 6/1953 | Campbell et al. | 101—44 |
| 2,691,937 | 10/1954 | Emerson | 101—44 |
| 2,692,552 | 10/1954 | Conkle | 101—115 |
| 2,946,278 | 7/1960 | Cummings | 101—44 |

References Cited by the Applicant
UNITED STATES PATENTS

| | | |
|---|---|---|
| 1,647,625 | 11/1927 | Higgins et al. |
| 1,904,332 | 4/1933 | Sidebotham. |
| 2,198,565 | 4/1940 | Schutz. |
| 2,437,224 | 3/1948 | Emerson. |
| 2,553,085 | 5/1951 | Groce. |
| 2,623,452 | 12/1952 | Emerson. |
| 2,841,075 | 7/1958 | Ryckman. |

ROBERT E. PULFREY, *Primary Examiner.*

WILLIAM B. PENN, *Examiner.*